United States Patent
Zhang (10) Patent No.: US 9,858,679 B2
(45) Date of Patent: Jan. 2, 2018

(54) DYNAMIC FACE IDENTIFICATION

(71) Applicant: Hewlett-Packard Development Company, L. P., Houston, TX (US)

(72) Inventor: Tong Zhang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 166 days.

(21) Appl. No.: 14/532,214

(22) Filed: Nov. 4, 2014

(65) Prior Publication Data

US 2016/0125232 A1    May 5, 2016

(51) Int. Cl.
| | |
|---|---|
| G06K 9/00 | (2006.01) |
| G06T 7/20 | (2017.01) |
| H04N 5/77 | (2006.01) |
| G06K 9/62 | (2006.01) |

(52) U.S. Cl.
CPC ........ *G06T 7/2046* (2013.01); *G06K 9/00288* (2013.01); *G06K 9/00771* (2013.01); *G06K 9/6222* (2013.01); *G06K 9/6276* (2013.01); *H04N 5/77* (2013.01)

(58) Field of Classification Search
None
See application file for complete search history.

(56) References Cited

U.S. PATENT DOCUMENTS

| | | | |
|---|---|---|---|
| 6,111,517 A | | 8/2000 | Atick et al. |
| 7,515,739 B2 | | 4/2009 | Porter et al. |
| 8,005,272 B2 | | 8/2011 | Grim et al. |
| 9,176,987 B1 | * | 11/2015 | Peng .................. G06F 17/30253 |
| 2008/0089561 A1 | * | 4/2008 | Zhang ............... G06F 17/30259 382/118 |
| 2009/0116695 A1 | * | 5/2009 | Anchyshkin ....... G06K 9/00221 382/106 |

(Continued)

FOREIGN PATENT DOCUMENTS

| | | |
|---|---|---|
| CN | 103942577 A | 7/2014 |
| WO | WO-2014075495 A1 | 5/2014 |

OTHER PUBLICATIONS

Xiong, Quanren, and Christopher Jaynes. "Mugshot database acquisition in video surveillance networks using incremental auto-clustering quality measures." Advanced Video and Signal Based Surveillance, 2003. Proceedings. IEEE Conference on. IEEE, 2003.*

(Continued)

*Primary Examiner* — Vikkram Bali
*Assistant Examiner* — Tracy Mangialaschi
(74) *Attorney, Agent, or Firm* — HP Inc. Patent Department (57) ABSTRACT

Systems and methods associated with dynamic face identification are disclosed. One example method includes matching a query face against a set of clusters in a dynamic collection. Matching the query face against the set of clusters may facilitate identifying a person associated with the query face. The example method also includes matching the query face against a set of images in a static gallery to identify the person. Matching the query face against the static gallery may be performed when matching the query face against the set of clusters fails to identify the person. The example method also includes updating the set of clusters in the dynamic collection using the query face.

20 Claims, 7 Drawing Sheets

(56) References Cited

U.S. PATENT DOCUMENTS

2009/0141988 A1\* 6/2009 Kovtun ............ G06F 17/30793
 382/225
2010/0177193 A1 7/2010 Flores
2011/0249904 A1\* 10/2011 Mochizuki ........... G06K 9/6255
 382/225

OTHER PUBLICATIONS

Ashwith Kumar S.K, "Detection and Tracking of Multiple Face Using TMS320C6748 DSP Board", May 2014.

\* cited by examiner

DYNAMIC FACE IDENTIFICATION

BACKGROUND

Video surveillance is an important security function used to record events at critical locations. Video feeds from cameras placed at the locations may be recorded for later review and/or sent to a centralized location for live viewing when an urgent response to a security event (e.g., a crime) is desired. In some cases, video feeds may be processed by a computer to follow individuals as they traverse the view of a camera, and also may identify the individuals by their faces. Consequently, some systems may employ a centralized database of faces against which faces of individuals captured by various cameras may be matched.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Systems and methods associated with dynamic face identification are described. In various examples, dynamic face identification may be achieved by, after initially identifying a person of interest who appears in video feed from an image in a static gallery, storing images of the person of interest in a dynamic collection that reflect more current states of the person than states of the person reflected by images in the static gallery. If the person of interest subsequently leaves and later reappears in the video feed, the dynamic collection of images may be queried before querying the static gallery when attempting to re-identify the person of interest. This may reduce the time it takes to re-identify the person, facilitating enhanced tracking of the person of interest while on the video feed.

Figure 1:
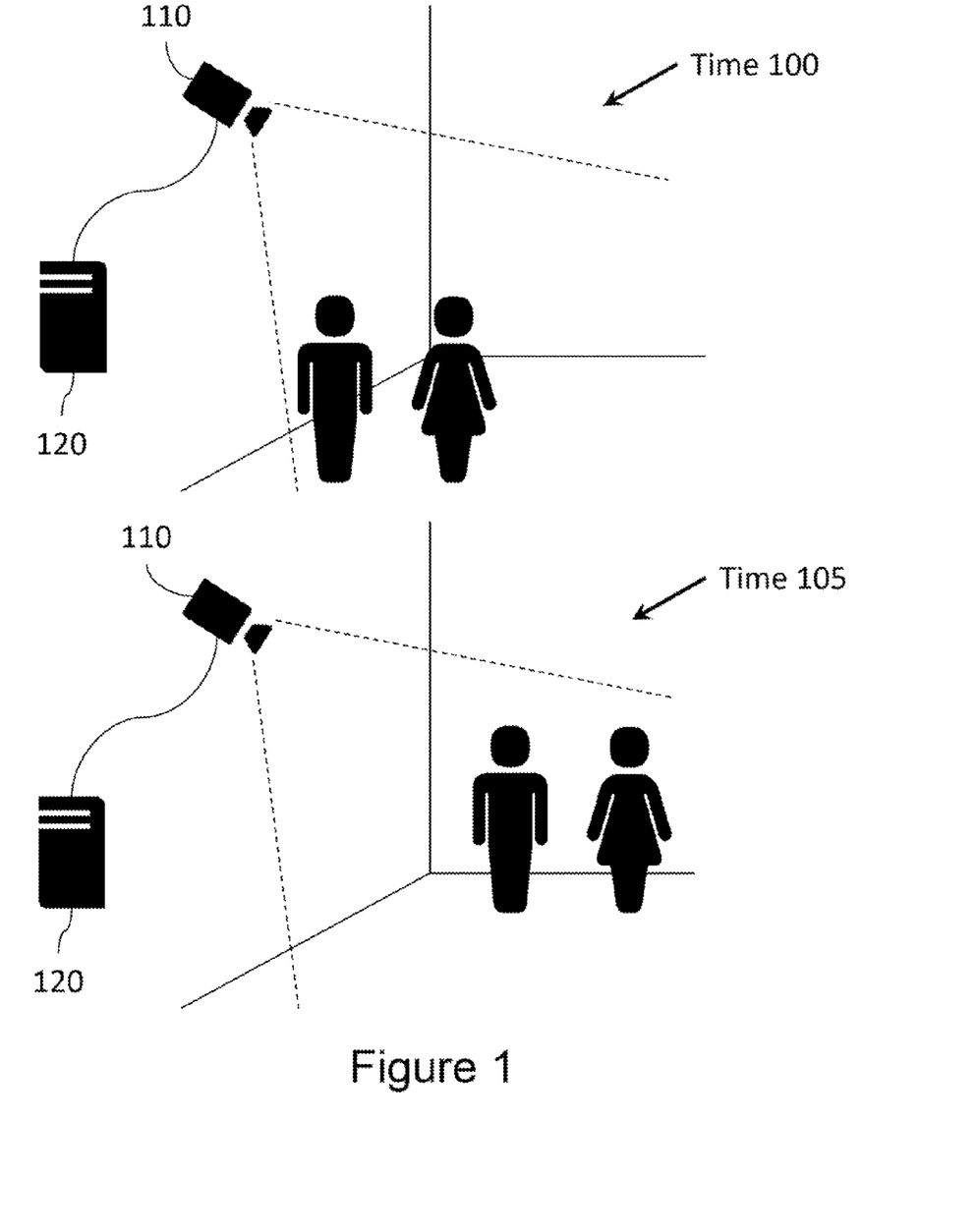
FIG. 1 illustrates an example physical environment on which example systems and methods, and equivalents may operate.

FIG. 1 illustrates an example physical environment at two points in time (time 100, time 105) on which example systems and methods, and equivalents may operate. It should be appreciated that the physical environment is an illustrative example and that systems and methods, and equivalents, may operate in various physical environments using a variety of technologies. Further, the solid lines are used to indicate that the physical environment is a three dimensional space, and consequently, they are not intended to convey any particular structure or whether the example physical environment is an interior space, an exterior space, a combination, and so forth.

The physical environment includes a camera 110 attached to a computer 120. Computer 120 may be designed to process a video feed transmitted from camera 110 to computer 120. Computer 120 may be attached to a network (not shown) to transmit the processed video feed to, for example, a centralized location where many other cameras ultimately transmit their video feeds. Alternatively, computer 120 may store the video feed locally or remotely for later review if an event the camera was installed to observe occurs. Computer 120 may, in some examples, process video feeds from multiple cameras 110. Additionally, computer 120 may be essentially built into camera 110 depending on the design of the surveillance system within which camera 110 and computer 120 operate.

One processing task computer 120 may perform is tracking and identifying persons who appear in the field of view of camera 110. By way of illustration, at time 100, a man and a woman are at a first position within the field of view, indicated by dashed lines, of camera 110. At time 105, the man and the woman are at a second position within the field of view of camera 110. Consequently, during their movement between their respective positions at time 100 and time 105, computer 120 may analyze frames retrieved from a video feed from camera 110 and track the positions of the man and the woman, and attempt to identify the man and the woman. For many systems, identifying the man may include isolating an image of the man from a frame of the video feed, and comparing the image to images in a static gallery of persons of interest. A similar process may be completed for the woman.

However, the physical environment may contain physical objects (not illustrated) that may, for example, obscure the field of vision of camera 110. Thus, the man and/or the woman may step out of the field of view of camera 110 for periods between time 110 and 105. These physical objects may include, for example, buildings, columns, furniture, and so forth.

Consequently, after disappearing from the field of view of camera 110, computer 120 may need to re-identify the man and the woman after they subsequently reappear in the field of view of camera 110. Merely tracking the positions of the man and the woman may be insufficient if, for example, the man and woman switch places while out of the field of view of camera 110, if the man and the woman are walking amongst a large number of persons in a crowded space, and so forth.

As a result, some systems may repeat the process described above when the man reappears from behind the obstructing object, including isolating a new image of the man, and comparing the image to images in the static gallery. However, this may be a slow process, especially if the static gallery is large and/or stored remotely from computer 120, resulting in a potentially noticeable delay between a person re-entering the field of view of camera 110, and their identification by computer 120.

Instead, after initially viewing the man and the woman at time 100, computer 120 may begin adding images of the man and woman to a local dynamic collection of images of people who have recently been viewed by camera 110. Consequently, if, for example, the man temporarily leaves the field of view of camera 110, a new image of the man, taken after the man reenters the field of view of camera 110 may be compared to the dynamic collection to quickly re-identify the man. The dynamic collection may be initially queried each time a person is detected within camera 110's field of view by computer 120 whether they are appearing for the first time or reappearing after a brief disappearance from the field of view of camera 110. If a person does not have entries within the dynamic collection, the image may be compared to the static gallery to attempt to identify the person. In some instances, using the dynamic collection may reduce the time it takes to re-identify persons recently viewed by camera 110 due to the processing and/or networking time it may take to query a static gallery. Further, because the dynamic collection may contain more current and a potentially larger variety of images of a person than the static gallery, the dynamic collection may be more reliable for identifying the person than the static gallery.

By way of illustration, as mentioned above, once a person is captured by camera 110, computer 120 may begin placing images of that person into the dynamic collection. These images may contain more up-to-date images of the person than the static gallery, including current features of the person (e.g., clothing, makeup, hairstyle) that may be changed easily over time. Additionally, the dynamic collection may be populated with images of the person in a series of facial positions, facing directions, and so forth relative to the camera that facilitate easier identification than a limited number of images of the person in the static collection. For example, if the static collection contains a single frontal image of the man, while camera 110 is pointing at the man from the left, images collected into the dynamic collection by computer 120 of the left profile of the man may be more useful for subsequent re-identification of the man than the single frontal image in the static gallery.

For each person recently captured by camera 110, images of that person may be organized into several clusters in the dynamic collection. The clusters in the dynamic collection may be organized so that images within the clusters share an attribute. These attributes may include, for example, the direction the person is facing in the cluster, lighting, location of the person relative to camera 110, and so forth. Additionally, prior to addition to the dynamic collection, images may be examined to ensure the dynamic collection contains images that are likely to facilitate successful re-identification of an individual. This may ensure that images in the dynamic collection, for example, show faces of persons as opposed to backs of heads, are not partially blocked by objects, and so forth. Consequently, images added to the dynamic collection may satisfy quality criteria including, for example, face size, eye localization confidence, and so forth.

To quickly identify which cluster a new image of the person should be placed into, feature vectors for the images in the cluster and the new image may be maintained. These feature vectors may account for the attributes mentioned above (e.g., lighting, location, face size), in addition to attributes associated with facial recognition (e.g., ratios between sizes of facial features). Accounting for facial recognition attributes may ensure, for example, that an image of a person does not get associated with a cluster that is not associated with that person.

For each cluster, a centroid of feature vectors within the cluster may be determined, and a feature vector of an image nearest the centroid may be compared to the feature vector of the new image to identify which cluster the new image of the person should be placed into. In an alternative example, the feature vector of the new image may be compared to centroids of clusters treated as feature vectors for identifying an appropriate cluster. The comparisons between the feature vector of the new image and the clusters may be distance based. Consequently, when a distance between the feature vector associated with the new image and the feature vector associated with a cluster falls below a threshold, the feature vector may be assigned to that cluster. If the distance between the feature vector associated with the new image, and feature vectors associated with all clusters exceeds the threshold, a new cluster may be created, with the new image serving as the basis for the new cluster.

To ensure the dynamic collection does not grow unbounded, the clusters and images maintained in the dynamic collection may be pruned over time based on, for example, memory available to computer 120. Individual images from clusters may be removed from the dynamic collection over time as, for example, outliers are identified, space is needed for newer images, and so forth. Additionally, if the person associated with a cluster has not been captured by camera 110 for a certain period of time, computer 120 may determine it is likely the person will not return, and that entire clusters associated with that person can removed from the dynamic collection as space is needed as new people enter the field of view of camera 110.

In various examples, computer 120 may also perform other types of analysis of frames of a video feed received from camera 110. For example, computer 120 may maintain a set of tracking targets. The tracking targets may be persons who have recently appeared in the field of view of camera 110, in one example, the set of tracking targets may include every person who has entered the field of view of camera 110. In another example, the set of tracking targets may be limited to persons who have been identified as being worthy of tracking by, for example, having an entry within the static image gallery. In either case, the dynamic collection may collect images into clusters for each tracking target identified by computer 120.

Computer 120 may have various techniques for maintaining and/or updating the set of tracking targets over time. First, computer 120 may employ face detection techniques on video frames received from camera 110 to detect new persons as they enter the video feed. The face detection techniques may identify faces within the frames which may then be associated with a newly generated tracking target. Once a face has been identified, the face may be compared to the dynamic collection and/or the static gallery to attempt to identify the person to whom the face belongs.

Computer 120 may also employ tracking techniques to attempt to follow individuals between frames without having to perform face detection and/or identify a person using the dynamic collection or static gallery. This may be useful because applying face detection techniques and/or attempting to identify an individual based on an image may be computationally intensive task when compared to tracking persons between frames. Because persons will typically not travel large distances between frames assuming new frames are taken many times a second, computation light techniques for identifying movement of objects within a frame may be applied instead of more computation intensive tasks.

Additionally, to avoid computation road blocks, some tasks performed by computer 120 may be staggered to avoid regularly performing the tasks on the same frame, and to avoid performing some higher computation tasks on every frame received from camera 110. This is because, depending on the processing power of computer 120, it may be unfeasible to perform multiple, computation intensive tasks on each frame received from camera 110, and keep up with the frames received over time. Thus, by performing lower computation intensity tasks regularly and higher computation intensity tasks sporadically, the higher computation intensity tasks may be completed over the course of several frames being received from camera 110.

In one example, face detection and managing the dynamic collection may be considered higher computation intensity tasks. Consequently, face detection may be performed every m frames, and managing the dynamic collection may be performed every n frames, where m and n are positive integers. In one example, m and n may be designed so that face detection and managing the dynamic collection are never performed on the same frame. This may be achieved by, for example, setting m and n to the same integer, but delaying the first frame on which one of the two tasks is performed. In another example, it may be desirable to occasionally perform face detection and manage the dynamic collection on the same frame. In this case it may be appropriate to set m and n to prime integers or to integers whose factorizations will occasionally cause the two tasks to be performed on the same frame. Other relationships between m and n may also be appropriate.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

Figure 2:
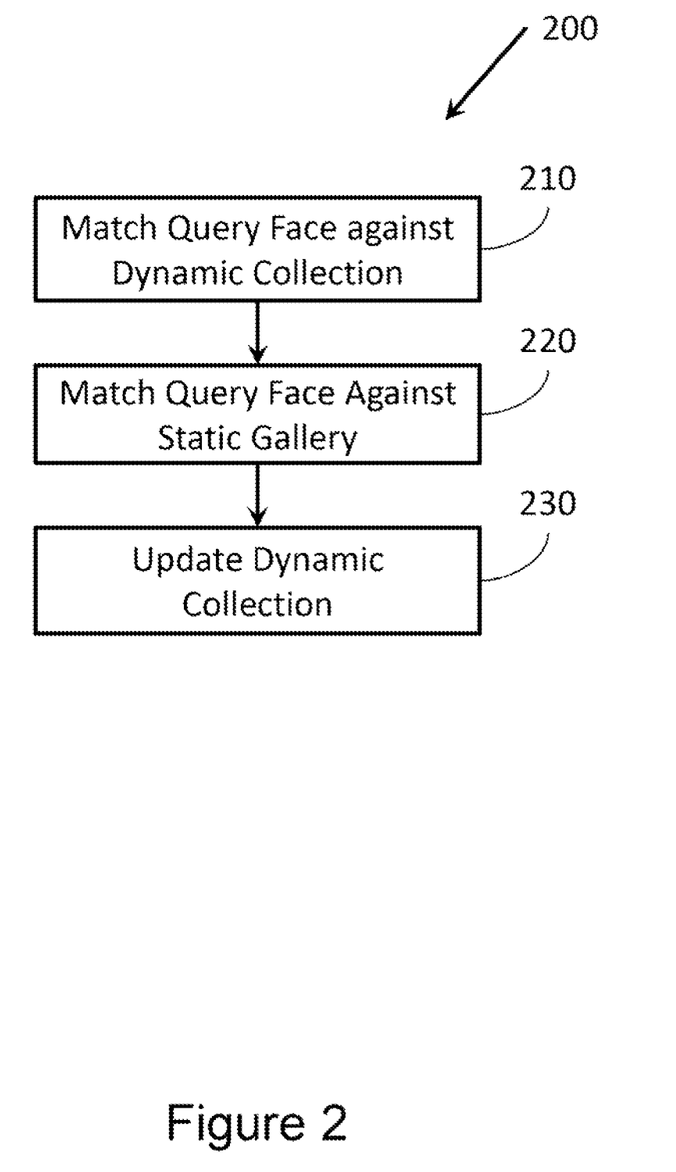
FIG. 2 illustrates a flowchart of example operations associated with dynamic face identification.

FIG. 2 illustrates a method 200 associated with dynamic face identification. Method 200 may be embodied on a non-transitory computer-readable medium storing computer-executable instructions. The instructions, when executed by a computer may cause the computer to perform method 200. Method 200 includes matching a query face against a set of clusters in a dynamic collection at 210. The query face may be a still image of the person obtained from a frame of a video feed. The video feed may be obtained from a camera operably connected to the computer performing method 200. Matching the query face against the dynamic collection may facilitate identifying a person associated with the query face. The dynamic collection may be stored, for example in a local memory (e.g., a RAM, a non-volatile memory). As detailed above, the images in the dynamic collection may include images of persons recently seen in the video feed. Consequently the dynamic collection may contain several recent images of persons of interest.

A cluster in the dynamic collection may contain a set of images of the person that share an attribute. The attribute may be, for example, a direction the person is facing, a spatial relationship between the person and a camera, a lighting coefficient, and so forth. Some clusters may be associated with multiple attributes. By way of illustration a first cluster may contain images of the person facing left in sunlight, while a second cluster contains images of the person facing right in the shade. In this example, other clusters may also exist in various combinations of attributes, and depending on the clustering process used, some clusters that incorporate multiple attributes may be generated (e.g., the person facing right in either sunlight or shade).

Method 200 also includes matching the query face against a set of images in a static gallery to identify the person at 220. The static gallery may be stored, for example, on a local storage media (e.g., a hard disk), at a remote storage media (e.g., on a remote server), and so forth. As described above, the static gallery may contain a limited number of images of the person taken at a prior point in time. Matching the query face against the set of images at 220 may be performed when matching the query face against the set of clusters fails to identify the person.

Method 200 also includes updating the set of clusters in the dynamic collection at 230. The set of clusters may be updated using the query face. In one example, updating the set of clusters may include modifying a member of the set of clusters. The member of the set of clusters may be modified when a distance between the query face and the member of the set of clusters falls below a threshold. Modifying the set of clusters may include adding the query face to the member of the set of clusters. This may cause some attributes of the cluster to be recalculated. In another example, updating the set of clusters may include generating a new member of the set of clusters. The new member of the set of clusters may be generated when distances between the query face and members of the set of clusters exceed the threshold. Upon generating the new member of the set of clusters, the query face may be placed into the new member of the set of clusters so that the cluster may be used for future comparisons of query faces against the dynamic collection.

Distances between query faces and members of the set of clusters may be generated by determining distances between feature vectors associated with the query face and feature vectors associated with model faces that correspond to members of the set of clusters. In one example, model faces for a cluster may be selected by computing a centroid of feature vectors of faces within that cluster and then selecting a face in the cluster closest to the centroid to be the model face.

Figure 3:
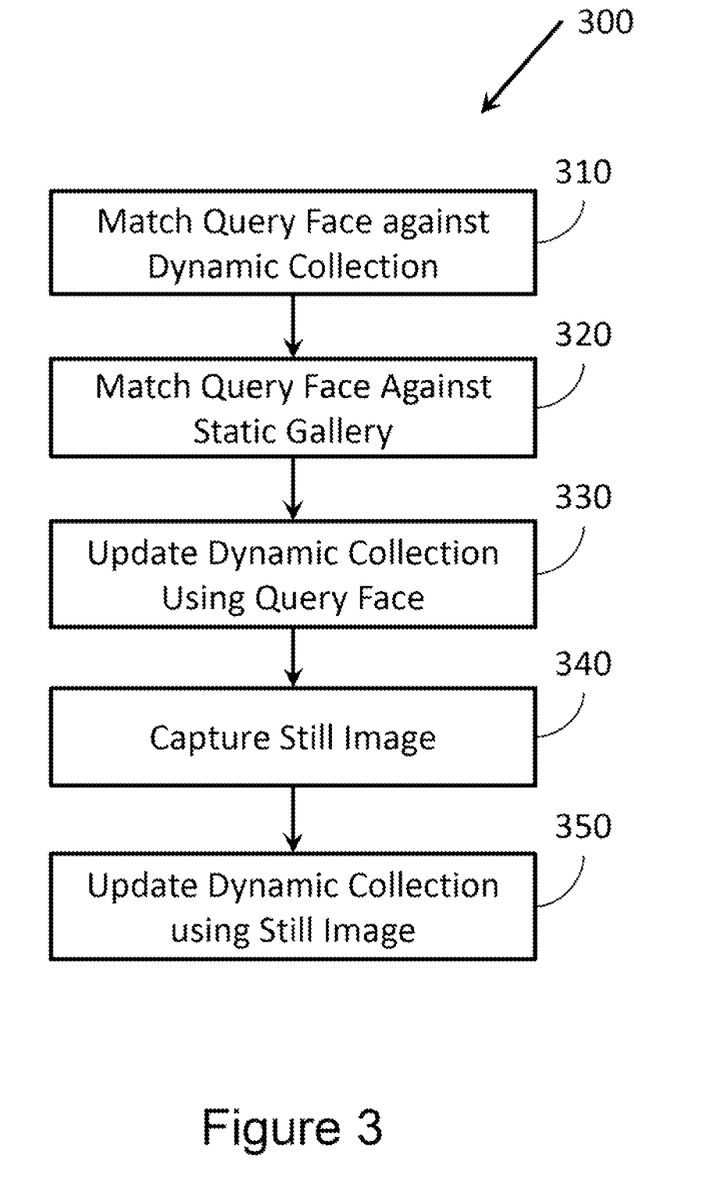
FIG. 3 illustrates another flowchart of example operations associated with dynamic face identification.

FIG. 3 illustrates a method 300 associated with dynamic face identification. Method 300 includes several actions similar to those described above with reference to method 200 (FIG. 2). For example, method 300 includes matching a query face against a dynamic collection at 310, matching the query face against a static gallery at 320, and updating the dynamic collection at 330.

Method 300 also includes capturing a still image of the person from a frame of a video feed at 340. Method 300 also includes updating the set of clusters in the dynamic collection using the still image at 350. Capturing still images of the person and updating the set of clusters in the dynamic collection using these still images may facilitate re-identification of the person at a later point in time. By tracking the person during their movements within the video feed, a still image of the person may be associated with an appropriate cluster in the dynamic collection without performing facial recognition analysis on the still image.

Figure 4:
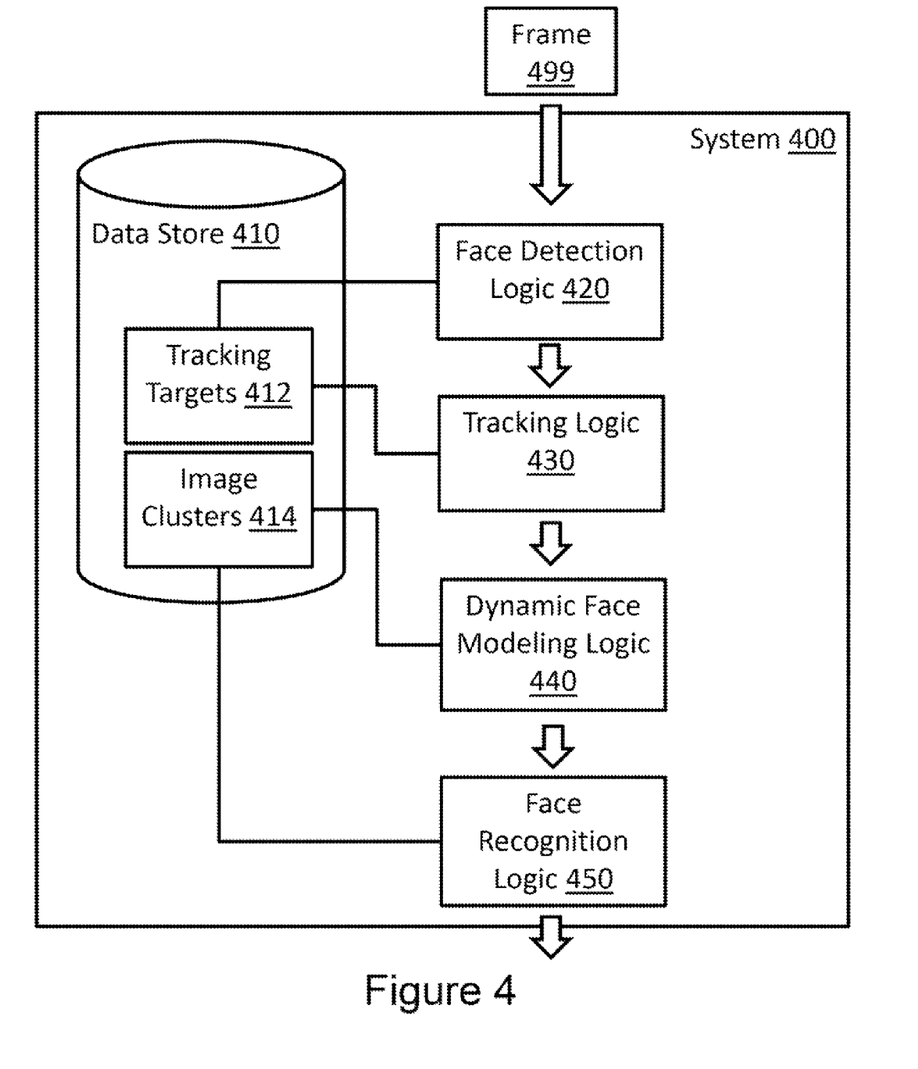
FIG. 4 illustrates an example system associated with dynamic face identification.

FIG. 4 illustrates a system 400 associated with dynamic face identification. System 400 includes a data store 410. Data store 410 stores a set of tracking targets 412 and a set of image clusters 414. Each image cluster 414 may be associated with a member of the set of tracking targets 412. Further, multiple image clusters 414 may be associated with each member of the set of tracking targets 412. In this example, data store 410 may be a local memory (e.g., a RAM, a non-volatile memory).

System 400 also includes a face detection logic 420. Face detection logic 420 may update the set of tracking targets 412 by identifying faces within frames 499 of a video feed (not shown). Face detection logic 420 may be periodically run to ensure tracking targets' locations in a space captured by the video feed are maintained. Face detection logic 420 may also be employed to identify new tracking targets 412 who appear within frames 499 of the video feed.

In one example, face detection logic 420 may operate by breaking down the frames 499 into overlapping patches and identifying whether each patch contains a face. Patches may be designed to account for distances between a camera capturing the video feed and the expected locations and sizes of faces within the space captured by the video feed. Face detection for an individual face may employ, for example, the Viola-Jones face detection method. Viola-Jones face detection may facilitate detection of frontal, half-profile, profile faces, and so forth, as well as faces at various degrees of vertical tilt.

To efficiently process the image, the patches may be screened for skin tone shaded pixels, and an intensity mean/variance check. These tests may be able to quickly identify whether a face is not in an image without, for example, searching for facial features. Patches that pass these tests may then be processed in parallel to identify whether the patch contains a face. Other methods of breaking down frames 499 for analysis and face detection techniques may also be employed.

Once faces have been detected, bounding boxes of patches that contain the faces may be compared to bounding boxes of patches from previous frames that also contain faces. Patches with a certain threshold overlap may be assumed to be the same person, and consequently tracking targets' locations may be updated to correspond to the new patch locations.

System 400 also includes a tracking logic 430. Tracking logic 430 may update the set of tracking targets 412 by identifying locations of members of the set of tracking targets 412 within the frames 499. To identify the locations of members of the set of tacking targets 412 within the frames 499, tracking logic may generate sequential Gaussian mixture models (SGMM's) for the foreground and background of each tracking target in a frame. These SGMM's may be updated each frame for each target, which may then be used on a subsequent frame to estimate a target's location.

In some examples, tracking logic 430 may employ less computationally intensive operations than face detection logic 420, though face detection logic 420 may be more reliable for pinpointing the location of a tracking target within a frame from the video feed. Consequently, for a majority of frames, identifying locations of members of the set of tracking targets 412 using tracking logic 430 may reduce the amount of computations performed by system 400 when monitoring locations of tracking targets 412. That said, face detection logic 420 may still be useful for periodically re-confirming that a tracking target is at a location predicted by tracking logic 430, and for identifying new tracking targets 412 that enter the space captured by the video feed.

System 400 also includes a dynamic face modeling logic 440. Dynamic face modeling logic 440 may collect an image of a captured member of the set of tracking targets 412 from the frames 499. Dynamic face modeling logic 440 may also update an image cluster 414 associated with the captured member of the set of tracking targets 412. As described above, dynamic face modeling logic 440 may select an image cluster 414 to update by calculating distances between the image of the captured member of the set of tracking targets and model images associated with the image clusters 414. These distances may be calculated based on feature vectors generated for the respective images.

System 400 also includes a face recognition logic 450. Face recognition logic 450 may identify a member of the set of tracking targets 412 as a person associated with an image in a fixed image gallery. The face recognition logic may identify the member as the person using, for example, the set of image clusters 414 and the fixed image gallery. The fixed image gallery may be stored on a local data store (not shown) embodied on a local storage media, a remote data store embodied on a remote storage media, and so forth. Consequently, face recognition logic 450 may first attempt to identify whether a tracking target is a person in the fixed image gallery using the image clusters 414. This may be because the image clusters 414 may be accessed more quickly than the fixed image gallery because the image clusters 414 are stored in memory, while the fixed image gallery is stored on a local or remote storage media. Face recognition logic 450 may also prefer the image clusters 414 because the image clusters 414 may contain images of persons of interest that have recently appeared in the video feed and because the images in the image clusters 414 are more current than images in the fixed image gallery. If there is no match for the person using the image clusters 414, face recognition logic 450 may query the fixed image gallery to attempt to identify the member of the set of tracking targets 412.

In one example, different logics in system 400 may operate in parallel and/or on different frames 499 from one another. By way of illustration face detection logic 420 may operate on every $m^{th}$ frame, and dynamic face modeling logic 440 may operate on every $n^{th}$ frame. In this example, m and n may be integers selected to limit the number of frames on which both face detection logic 420 and dynamic face modeling logic 440 operate. As mentioned above, this may mean that m and n are the same integer but offset by a number of frames, or that m and n are integers that are selected to periodically ensure that both face detection logic 420 and dynamic face modeling logic 440 operate on the same frame.

Figure 5:
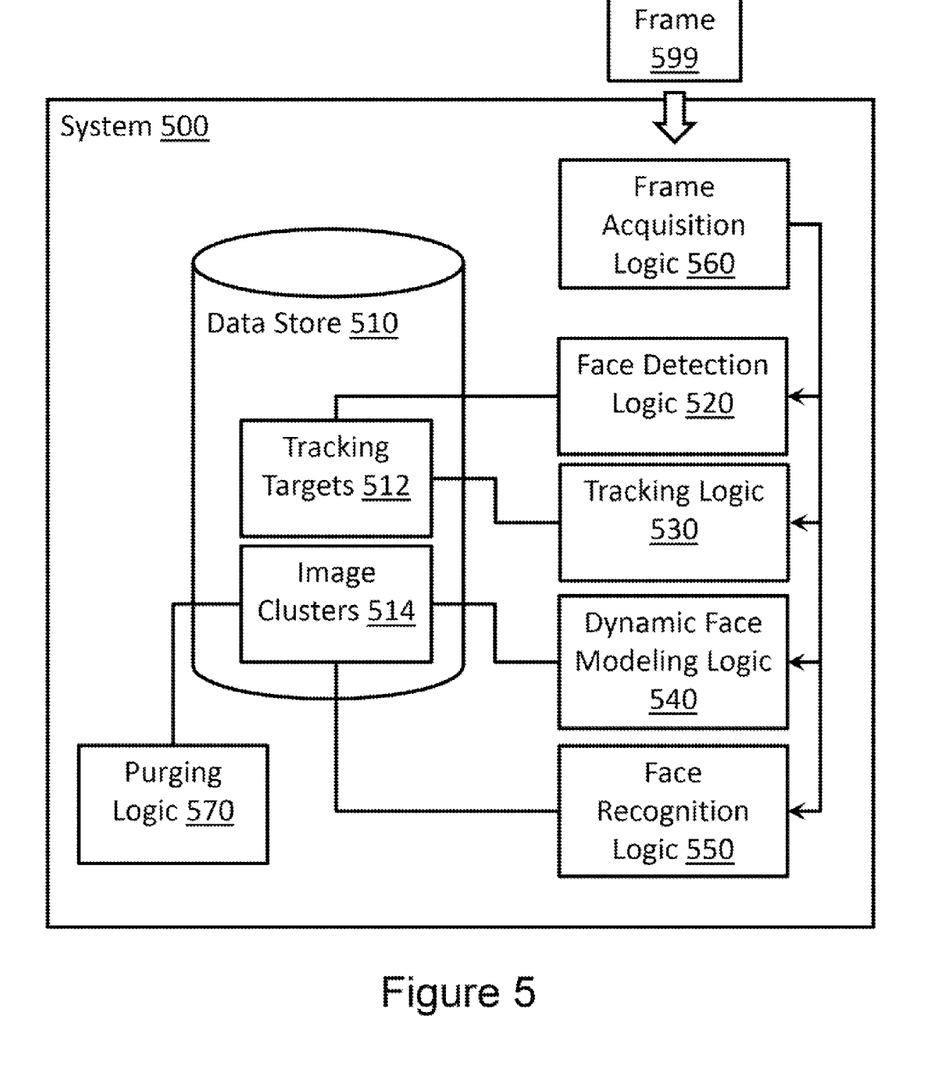
FIG. 5 illustrates another example system associated with dynamic face identification.

FIG. 5 illustrates a system 500 associated with dynamic face identification. System 500 includes several items similar to those described above with reference to system 400 (FIG. 4). For example, system 500 includes a data store 510 storing a set of tracking targets 512 and a set of image clusters 514, a face detection logic 520, a tracking logic 530, a dynamic face modeling logic 540, and a face recognition logic 550.

System 500 also includes a frame acquisition logic 560. Frame acquisition logic 560 may obtain frames 599 from a video feed. Frame acquisition logic 560 may also prepare the frames 599 for processing. Thus, frame acquisition logic 560 may perform various pre-processing tasks on frames 599 to facilitate operation of other logics in system 500. Performing these preprocessing tasks separately from the other logics may reduce the amount of processing work performed by these logics and enhance parallelization of work by system 500. Further, some preprocessing tasks may be useful to multiple logics, and therefore frame acquisition logic 560 performing overlapping tasks may reduce the overall number of times these preprocessing tasks are performed. Frame acquisition logic may also provide the frames 599 to other logics within system 500 including, for example, face detection logic 520, tracking logic 530, dynamic face modeling logic 540, and face recognition logic 550. The frames may be provided to the various logics based on, for example, how often it is desired that the differing logics operate on frames pulled from the video feed.

System 500 also includes a purging logic 570. Purging logic 570 may evict image clusters 514 from data store 510. Image clusters 514 evicted may be image clusters 514 associated with a purged member of the set of tracking targets 512. Images clusters 514 may be evicted when the purged member of the set of tracking targets 512 has been absent from frames 599 for a predetermined period of time.

Purging logic 570 may also select images from clusters for purging when a subset of clusters associated with a member of the set of tracking targets 512 exceeds a certain size threshold. In this case, the images selected by purging logic 570 may be selected based on ages of the images in the subset of clusters.

Figure 6:
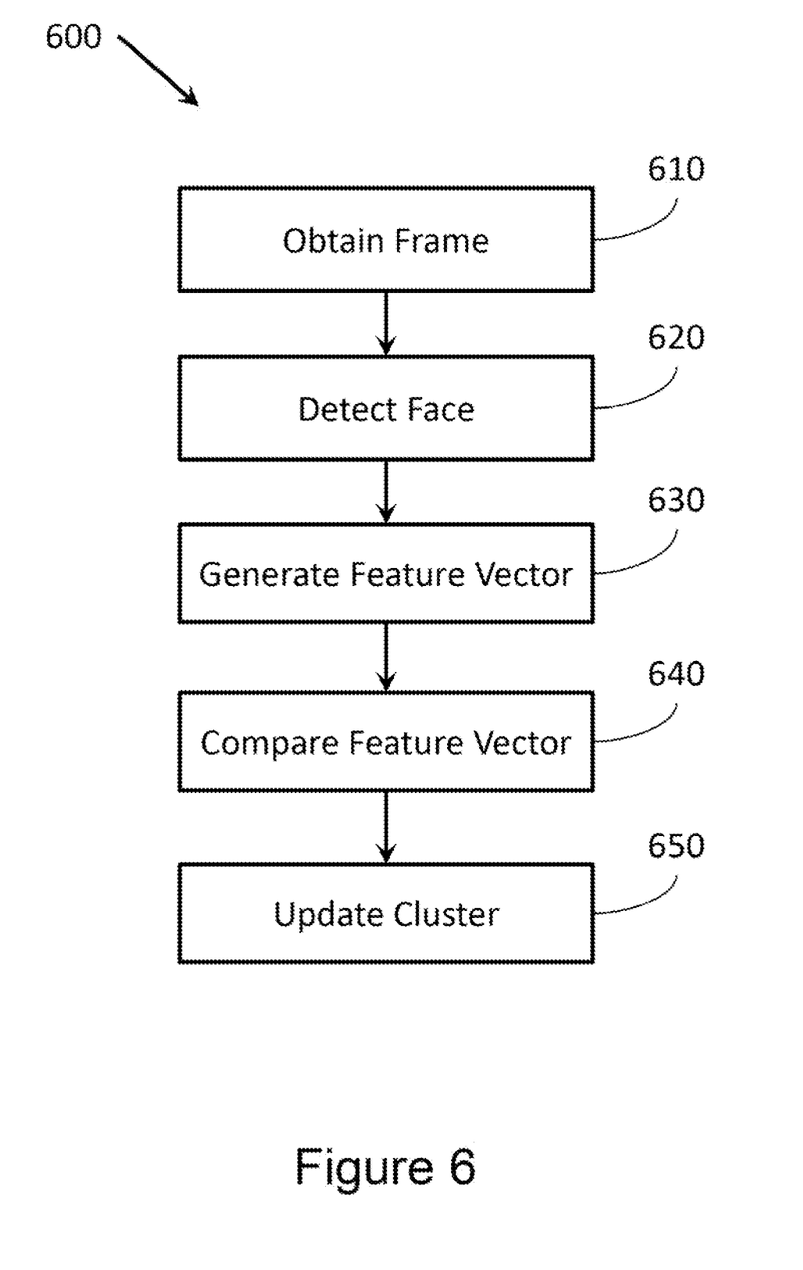
FIG. 6 illustrates another flowchart of example operations associated with dynamic face identification.

FIG. 6 illustrates a method 600 associated with dynamic face identification. Method 600 includes obtaining a frame from a video feed at 610. Method 600 also includes detecting a face within the frame at 620. Method 600 also includes generating a feature vector for the face at 630. Method 600 also includes comparing the feature vector for the face to feature vectors associated with clusters in a dynamic collection of faces at 640. Comparing the feature vector for the face to feature vectors associated with the clusters may facilitate identifying a person associated with the face. Method 600 also includes updating a cluster associated with the person at 650. The cluster may be updated based on the face. Updating the cluster may include modifying the cluster. Updating the cluster may also include generating a new cluster incorporating the feature vector for the face.

Figure 7:
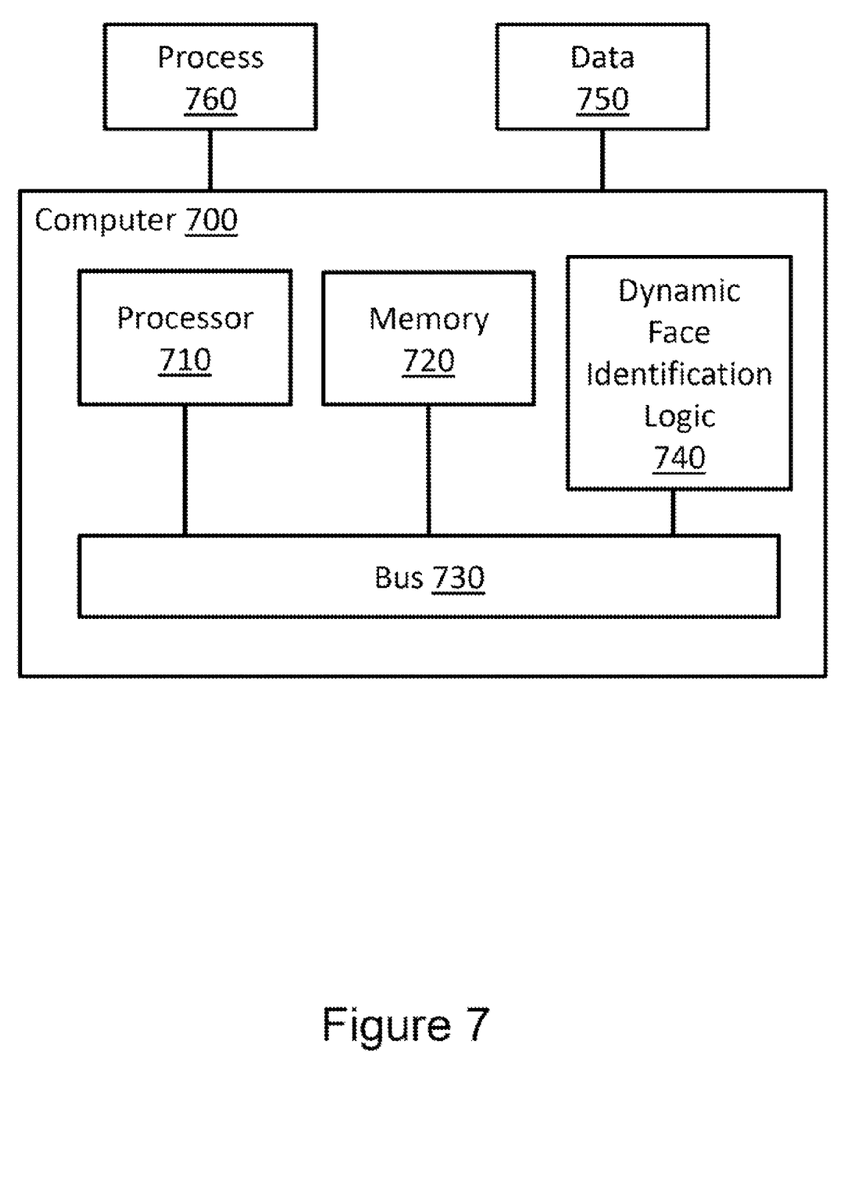
FIG. 7 illustrates an example computing device in which example systems and methods, and equivalents, may operate.

FIG. 7 illustrates an example computing device in which example systems and methods, and equivalents, may operate. The example computing device may be a computer 700 that includes a processor 710 and a memory 720 connected by a bus 730. The computer 700 includes a dynamic face identification logic 740. In different examples, dynamic face identification logic 740 may be implemented as a non-transitory computer-readable medium storing computer-executable instructions in hardware, software, firmware, an application specific integrated circuit, and/or combinations thereof.

The instructions may also be presented to computer 700 as data 750 and/or process 760 that are temporarily stored in memory 720 and then executed by processor 710. The processor 710 may be a variety of various processors including dual microprocessor and other multi-processor architectures. Memory 720 may include volatile memory (e.g., read only memory) and/or non-volatile memory (e.g., random access memory). Memory 720 may also be, for example, a magnetic disk drive, a solid state disk drive, a floppy disk drive, a tape drive, a flash memory card, an optical disk, and so on. Thus, memory 720 may store process 760 and/or data 750. Computer 700 may also be associated with other devices including other computers, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A non-transitory computer-readable medium storing computer-executable instructions that when executed by a computer cause the computer to:
   match a query face against a set of clusters in a dynamic collection to identify a person associated with the query face, wherein the dynamic collection includes a set of tracking targets and current features of the person in a series of facial positions and facing directions than a more limited set of images of the person in a static gallery taken at a prior point in time, and wherein images within a cluster share an attribute for identification with the query face of the person using the set of tracking targets;
   match the query face against the set of images in the static gallery to identify the person, when matching the query face against the set of clusters fails to identify the person; and
   update the set of clusters in the dynamic collection using the query face by adding the query face to a new member of a cluster when a distance between the query face and members of the cluster exceed a distance threshold and recalculating the attribute of the cluster.

2. The non-transitory computer-readable medium of claim 1, where the instructions further cause the computer to:
   capture a still image of the person from a frame of a video feed; and
   update the set of clusters in the dynamic collection using the still image.

3. The non-transitory computer-readable medium of claim 1, wherein the query face is a still image of the person obtained from a frame of a video feed, and when the person has not been captured by the video feed for a predetermined period of time, remove an entire set of clusters and tracking targets associated with the person from the dynamic collection.

4. The non-transitory computer-readable medium of claim 1, where the instructions that cause the computer to update the set of clusters include instructions that cause the computer to:
   modify a member of the set of clusters when a distance between the query face and the member of the set of clusters falls below a threshold; and
   generate a new member of the set of clusters when distances between the query face and members of the set of clusters exceed the threshold.

5. The non-transitory computer-readable medium of claim 4, where the distance between the query face and the member of the set of clusters is generated by determining a distance between feature vectors associated with the query face and a model face associated with the member of the set of clusters.

6. The non-transitory computer-readable medium of claim 5, where the model face is selected from the member of the set of clusters by:
   computing a centroid of feature vectors of faces of the member of the set of clusters; and
   selecting a face closest to the centroid to be the model face.

7. The non-transitory computer-readable medium of claim 1, where the dynamic collection is stored in a local memory, and where the static gallery is stored at one of a local storage media and a remote storage media.

8. The non-transitory computer-readable medium of claim 1, where a member of the set of clusters comprises a set of images of the person that share an attribute.

9. The non-transitory computer readable medium of claim 2, wherein by using the set of tracking targets to track the person during their movements within the video feed, the still image of the person is associated with an appropriate cluster in the dynamic collection without performing facial recognition analysis of the still image with the static gallery.

10. A system, comprising:
    a data store to store a set of tracking targets and a set of image clusters in a dynamic collection, wherein each image cluster is associated with a member of the set of tracking targets and the set of image clusters in the dynamic collection includes current features of a person in a series of facial positions and facing directions than a more limited set of images of the person in a fixed image gallery taken at a prior point in time; and a processor coupled to the data store, the processor configured to execute at least partially:

a face detection logic to update the set of tracking targets by identifying faces within frames from a video feed, and wherein images within an image cluster share an attribute for identification with the faces within frames from the video feed using the set of tracking targets;

a tracking logic to update the set of tracking targets by identifying locations of members of the set of tracking targets within the frames;

a dynamic face modeling logic to collect an image of a captured member of the set of tracking targets from the frames and to update the image cluster associated with the captured member of the set of tracking targets by adding the image of the captured member to a new member of the image cluster when a distance between the image of the captured member and members of the cluster exceed a distance threshold and recalculating the attribute of the image cluster; and a face recognition logic to identify, using one or more of the set of image clusters and the fixed image gallery, a member of the set of tracking targets as the person associated with an image in the fixed image gallery.

11. The system of claim 10, further comprising a frame acquisition logic to obtain the frames from the video feed and to prepare the frames for processing.

12. The system of claim 10, where the data store is a local memory, and where the fixed image gallery is stored at one of a local data store embodied on a local storage media and a remote data store embodied on a remote storage media.

13. The system of claim 10, comprising a purging logic to evict image clusters associated with a purged member of the set of tracking targets from the data store when the purged member of the set of tracking targets has been absent from frames for a predetermined period of time.

14. The system of claim 10, where the face detection logic operates on every $m^{th}$ frame, where the dynamic face modeling logic operates on every $n^{th}$ frame, and where m and n are integers selected to limit the number of frames on which both the face detection logic and the dynamic face modeling logic operate.

15. The system of claim 10, wherein the tracking logic further comprises logic to use the set of tracking targets to track the person during their movements within the video feed, the image of the captured member is associated with an appropriate cluster in the dynamic collection without performing the facial recognition logic.

16. A computer implemented method, comprising:
obtaining by a computer, a frame from a video feed;
detecting by the computer, a face within the frame thereby creating a query face;
generating by the computer, a feature vector for the query face;
comparing by the computer, the feature vector for the query face to feature vectors associated with image clusters in a dynamic collection of faces to identify a person associated with the query face wherein the dynamic collection includes a set of tracking targets having members associated with respective image clusters, wherein the image clusters include current features of the person in a series of facial positions and facing directions than a more limited set of images of the person in a fixed image gallery taken at a prior point in time, and wherein images within an image cluster share an attribute for identification with the faces within frames from the video feed using the set of tracking targets;
updating by the computer, an image cluster associated with the person based on the face by adding the query image to a new member of the image cluster when a distance between the query image and members of the cluster exceed a distance threshold and recalculating the attribute of the image cluster; and
comparing by the computer, the feature vector for the query face with a set of images in the fixed image gallery to identify the person when comparing the feature vector does not identify the person associated with the query face in the dynamic collection.

17. The computer implemented method of claim 16, where updating the image cluster includes one or more of modifying the image cluster and generating a new image cluster incorporating the feature vector for the face.

18. The computer implemented method of claim 16, further comprising removing by the computer, an entire set of image clusters associated with the person from the dynamic collection when the person has not been identified in the video feed for a predetermined period of time.

19. The computer implemented method of claim 18, further including wherein when the person is identified in the fixed image gallery, updating by the computer, a new image cluster associated with the person based on the face by adding the query image to a new member of the new image cluster in the dynamic collection.

20. The computer implemented method of claim 16, further comprising using the set of tracking targets to track the person during their movements within the video feed and the query image of the person is associated with an appropriate cluster in the dynamic collection without performing facial recognition analysis of the query image using the fixed image gallery.

* * * * *